United States Patent Office 3,677,698
Patented July 18, 1972

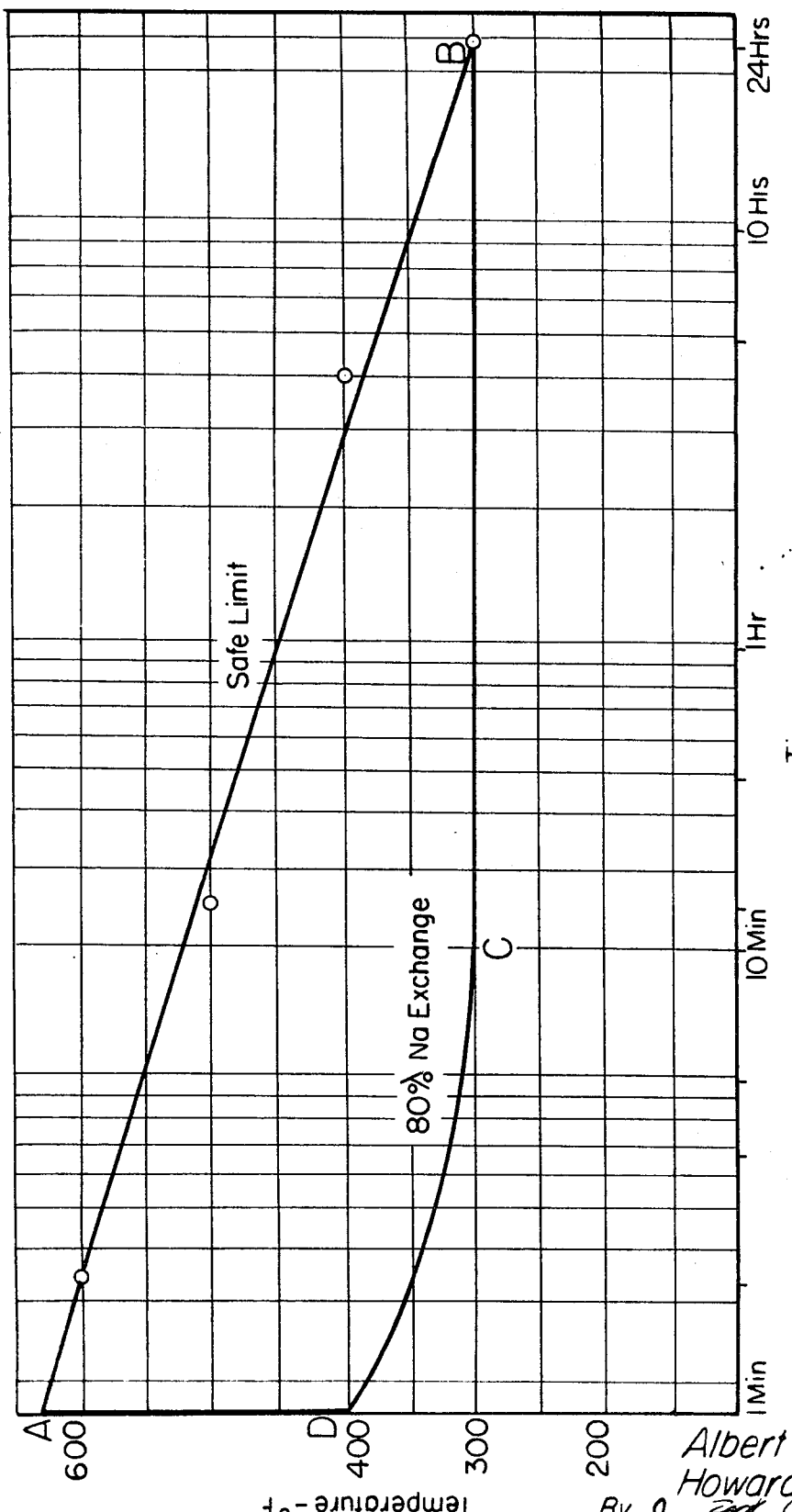
FIGURE
Rare Earth Exchange of Faujasite

3,677,698
LOW TEMPERATURE-HIGH TEMPERATURE TWO-STAGE ION EXCHANGE OF ZEOLITES
Howard S. Sherry, Trenton, N.J., and Albert B. Schwartz, Philadelphia, Pa., assignors to Mobil Oil Corporation
Filed Apr. 16, 1970, Ser. No. 29,210
Int. Cl. C01b 33/28; B01j 11/40
U.S. Cl. 23—112        8 Claims

ABSTRACT OF THE DISCLOSURE

A method for reducing the original metal content of a crystalline aluminosilicate zeolite to an exceptionally low level which comprises the steps of:
  (a) contacting said crystalline aluminosilicate with a solution of a cation of a metal selected from Groups I to VIII of the Periodic Table, ammonium and hydrogen at a temperature between 50° F. and 215° F. under atmospheric pressure;
  (b) contacting said crystalline aluminosilicate with a solution of a metal of Groups I to VIII of the Periodic Table at a temperature between 300° F. and 600° F. under sufficient pressure to maintain the solution in the liquid phase; and
  (c) withdrawing a cation exchanged zeolite having at least 80 percent of its initial cations exchanged with the cations of said solutions.

BACKGROUND OF THE INVENTION

Field of the invention

This invention relates to the ion exchanging of zeolites of the crystalline aluminosilicate type and, more particularly, to reduction in the initial alkali metal content of such zeolites to a level below about 1 percent by weight in an essentially two-step process.

Discussion of the prior art

Ion exchange of crystalline aluminosilicates is broadly old and is disclosed in numerous patents such as U.S.P. 3,140,253. Ion exchange is generally accomplished by contacting a form of the zeolite with a solution of a salt, the cation of which it is desired to replace for alkali metal in the crystalline aluminosilicate. Generally speaking, multiple exchanges have been used to reduce the alkali metal content to a level wherein the residual exchangeable alkali metal is such that it does not adversely affect catalysis. Some methods have heretofore been proposed which embody a calcination step between multiple exchanges. In any event, the processes of the art generally involve repetitive exchanges or multiple exchanges with intermediate calcination to reduce the alkali metal content to a low enough level to obtain a crystalline aluminosilicate of the desired catalytic activity. Prior art processes to carry out the same extent of ion exchange generally requires multiple exchanges or calcination and exchange techniques. They produce a material which is equivalent catalytically to materials prepared by the process of the invention below disclosed which embodies essentially only a two-step ion exchange process. The method of the present invention is simple and more efficient than the methods of prior art.

SUMMARY OF THE INVENTION

Broadly, this invention contemplates a method for reducing the original metal content of a crystalline aluminosilicate zeolite to an exceptionally low level which comprises the steps of:
  (a) contacting said crystalline aluminosilicate with a solution of a cation of a metal selected from Groups I to VIII of the Periodic Table, and ammonium and hydrogen at a temperature between 50° F. and 215° F. under atmospheric pressure;
  (b) contacting said crystalline aluminosilicate with a solution of a metal of Groups I to VIII of the Periodic Table at a temperature between 300° F. and 600° F. under sufficient pressure to maintain the solution in the liquid phase; and
  (c) withdrawing a cation exchanged zeolite having at least 80 percent of its initial cations exchanged with the cation of said solutions.

In a particularly desirable embodiment, this invention contemplates a method of reducing the original cation content of a crystalline aluminosilicate by at least 80 percent by weight which comprises the steps of:
  (1) initially contacting a crystalline aluminosilicate in its alkali metal form with a solution of a salt of a cation selected from the group consisting of metals of Groups I to VIII of the Periodic Table, ammonium and hydrogen, said solution at a temperature between 50 and 215° F. under atmospheric pressure;
  (2) contacting the said cation exchanged crystalline aluminosilicate from the previous step with a solution of a cation of a metal of Groups I to VIII of the Periodic Table at a temperature between 300 and 600° F. under a pressure sufficient to maintain the solution in the liquid phase for a time insufficient to cause substantial crystal destruction of said aluminosilicate; and
  (3) recovering a cationic exchanged aluminosilicate after the aforesaid two successive exchanges.

DESCRIPTION OF THE SPECIFIC EMBODIMENTS

The method of the present invention is outlined above. In its essence, the invention contemplates two different ion exchanges, one of which is with a solution having a temperature between 50° F. and 215° F. at atmospheric pressure. The other exchange is performed employing an exchange solution having a temperature between 300° F. and 600° F. This latter exchange, denoted "high temperature" exchange, occurs for only a short period of time such that the crystalline aluminosilicate is not subjected to the high temperature for a period of time sufficient to effect substantial crystal destruction of the crystalline aluminosilicate. The initial exchange can be carried out at a temperature within the range of 50° F. and 215° F. Preferably, the initial exchange with a solution at about 150° F. to 200° F. is performed at atmospheric pressure. Thereafter, the exchanged crystalline aluminosilicate is placed in a closed vessel containing a second ion exchange solution and is exchanged at a temperature between 300° F. and 600° F. In the second exchange according to the most preferred embodiment of this invention, the pressure is maintained sufficient to keep the solution in the liquid state. Generally speaking, an autoclave which provides autogeneous pressure is sufficient to accomplish this. However, external sources of pressure can be utilized to maintain the solution in a liquid and such may be desirable when the exchange is performed in a continuous manner employing, for instance, a tubular reaction zone, through which exchange solution passes.

More specifically, the present invention is performed by contacting an alkali metal crystalline aluminosilicate zeolite with a cationic exchange solution at 120° F. to 215° F. such that between 10 and 75 percent by weight of the original metal cations are exchanged. When the exchange has reached that amount, the partially exchanged crystalline aluminosilicate is removed and placed in a high temperature reactor for the high temperature base exchange. It has been found that a highly efficient method for accomplishing the objects of the present invention comprises employing fresh exchange solutions in the high temperature exchange stage of the present procedure and subsequently using the effluent solution from that step for the atmospheric pressure stage. Thus, it is possible to perform the process of the present invention in a continuous manner wherein the crystalline aluminosilicate is initially contacted at atmospheric pressure with a lean exchange solution and thereafter ion exchanged at high temperature and superatmospheric pressure with a fresh solution of salt, the cation of which it is desired to replace the alkali metal of the crystalline aluminosilicate.

It has been experimentally found that by the present method of the present invention, zeolites can be thoroughly exchanged, i.e. greater than 80 percent of their original metal cations can be removed resulting in a more active and stable catalytic component. Incorporation of a countercurrent process, wherein the effluent exchange solution from the high temperature, high pressure exchange is used as the exchange solution to the atmospheric pressure stage, results in a high degree of ion exchange with almost 100 percent utilization of the ion exchange solution.

Suitable crystalline aluminosilicates for use in the present invention are described in U.S.P. 3,140,249, hereby incorporated herein by reference, as well as in U.S.P. 3,140,251, issued on July 7, 1964, to C. J. Plank and E. J. Rosinski, and also incorporated herein by reference. Representative crystalline aluminosilicates suitable for the present invention include: zeolites X, A, Y, L, D, ZK-4, ZK-5, synthetic offretite, mordenite, ZSM-4 (French Pat. 1,502,289), ZSM-5 (Belgian Pat. 713,576), ZSM-3 (U.S. 3,415,736), as well as naturally occurring crystalline aluminosilicates such as analcite, chabazite, clinoptilolite, gmelinite, faujasite, cancrinite, leucite, scapolite, mesolite, mordenite, natrolite, sodalite and others.

The method of the present invention embodies in one step a high temperature ion exchange conducted in a closed reactor maintained under at least autogeneous pressure for a short period of time, such that the crystallinity of the crystalline aluminosilicate is not substantially damaged. As indicated above, the high temperature ion exchange is performed under pressure and the high temperature ion exchange solution can pass through a confined region, suitably a tubular reactor having a temperature normally above the boiling point of the solution under autogeneous pressure. It has been found that such high temperature ion exchange can be effected only for a relatively short period of time if substantial crystal destruction is to be avoided. Correlations may be developed from the parameters of time and temperature to define optimum and/or maximum time periods of ion exchange for various concentrations as a function of temperature. Above such maximum time periods, crystal destruction proceeds. Similar correlations can be developed to define minimum time periods of base exchange for each solution as a function of temperature to effect replacement in the two-stage process of at least 80 percent of the original cation content and preferably at least 90 percent of the original metal cation content of crystalline aluminosilicate treated when the original cation is sodium above such minimum time periods at least 80 percent of sodium exchange takes place in the combined stages; below such maximum time periods, crystal destruction is avoided. Thus, the method of the present invention defines the high temperature ion exchange operation of the two-stage process within a time period and temperature defined by a maximum and minimum correlation of time as a function of ion exchange solution temperature.

The attached figure illustrates the definition of a suitable range of base exchange of synthetic faujasite with a rare earth chloride solution. Thus, the area bounded by ABCD defines ranges of operation wherein 80 percent exchange of sodium may be effected while substantial crystalline destruction is avoided. In order to develop the correlations of the figure, samples of sodium zeolite X or Y were exchanged with aqueous rare earth chloride solutions at 0.1 N. At each exchange temperature, the time was measured first to achieve 80 percent sodium exchange, and second, to determine where crystallinity began to decrease as a result of crystal destruction. Curve AB represents the safe limit points, above which crystallinity began to fall off. Accordingly, recommended ion exchange operation is undertaken within the bounded area ABCD. Similar correlations may be developed for other base exchange solutions and other crystalline aluminosilicates by those skilled in the art.

The combined two-stage countercurrent low temperature-high temperature ion exchange of the present invention provides maximum simplicity of operation as well as maximum ion exchange efficiency. The total exchange can be accomplished in little over an hour and a half employing a countercurrent process as apparent from the ensuing examples. The sodium content of X or Y zeolite is generally reduced to less than 1 weight percent based on the total weight of the zeolite being exchanged. When exchanging with rare earth cations which provide zeolite stability, the resultant zeolite contains at least 90 percent rare earth stoichiometrically equivalent to the sodium replaced. This high degree of exchange can be achieved using commercial rare earth chloride solutions of about 0.02 to 0.8 normality. The initial low temperature exchange places about 10 to 75 percent and preferably 20 to 60 percent of the rare earth ions into the zeolite, sodium ions going into the exchange solution in the ratio of 3 sodium ions per rare earth ion exchanged into the zeolite. This initial low temperature exchange provides an intermediate exchanged zeolite suitable for the high temperature exchange which can be accomplished in a very short time.

In order to more fully illustrate the nature of the present invention and the manner of practicing the same, the following examples are presented. In the examples below, there is set forth in tabular form various ion exchanges of Linde zeolite Y or Linde zeolite 13X, both of which exist in the as synthesized form as sodium crystalline aluminosilicates. The initial ion exchange was at a temperature of 160° F. employing an aqueous solution of rare earth chloride. The first stage ion exchange was performed employing ion exchange solutions at 160° F. The second stage ion exchange was performed generally at temperatures of 500° F. except for the sample of Linde 13X which was ion exchanged in the stage at 400° F.

[Two-stage countercurrent rare earth exchange of NaY or NaX]

| | Charge material type | | | | | | | | |
|---|---|---|---|---|---|---|---|---|---|
| | Linde Y | Linde Y | Linde Y | Linde Y | Linde Y | Linde Y | Linde Y | Linde Y | Linde 13X |
| Percent weight: | | | | | | | | | |
| Na | 8.9 | 8.9 | 8.9 | 8.9 | 8.9 | 8.9 | 8.9 | 8.9 | 14.4 |
| $SiO_2$ | 65.7 | 65.7 | 65.7 | 65.7 | 65.7 | 65.7 | 65.7 | 65.7 | 48.9 |
| $Al_2O_3$ | 21.3 | 21.3 | 21.3 | 21.3 | 21.3 | 21.3 | 21.3 | 21.3 | 32.0 |
| 1st stage: | | | | | | | | | |
| Temperature, °F | 160 | 160 | 160 | 160 | 160 | 160 | 160 | 160 | 160 |
| Time, hr | 1.5 | 1.5 | 1.5 | 1.5 | 1.5 | 1.5 | 1.5 | 1.5 | 2 |
| EQ $RE^{3+}$/EQ NaY or NaX | 0.223 | 0.225 | 0.204 | 0.204 | 0.365 | 0.365 | 0.365 | 0.365 | 0.522 |
| Na, percent wt | 6.70 | 7.3 | 6.5 | 6.5 | 5.45 | 5.78 | 5.78 | 5.78 | 5.3 |
| $RE_2O_3$, percent wt | 4.64 | 4.19 | 6.08 | 6.08 | 8.87 | 8.6 | 8.6 | 8.6 | 16.9 |
| Percent exchanged | 0.371 | 0.264 | 0.343 | 0.353 | 0.450 | 0.418 | 0.418 | 0.418 | 0.560 |
| 2nd stage: | | | | | | | | | |
| Temperature, °F | 500 | 500 500 | 500 500 | 500 | 500 500 | 500 | 500 | 500 | 400 |
| Time, min | 1.8 | 1.75 1.8 | 3.8 1.2 | 1.1 | 5.3 2.6 | 2.0 | 4.4 | 4.08 2.56 | 3.62 5.40 |
| EQ $RE^{3+}$/EQ NaY or NaX | 0.925 | 0.929 | 0.966 0.929 | 1.040 | 0.932 1.036 | 0.9000 | 0.938 | | 0.940 |
| Na, percent wt | 1.0 | 0.99 1.1 | 0.77 1.36 | 1.24 | 0.76 0.42 | 1.1 | 0.45 | 0.55/.83 1.12 | 1.00 0.97 |
| $RE_2O_3$, percent wt | 17.8 | | | | | | | 19.3 | |
| Percent exchanged | 0.89 | 0.89 0.88 | 0.92 0.86 | 0.87 | 0.92 0.95 | 0.88 | 0.95 | 0.94/.92 0.87 | 0.91 0.92 |

We claim:
1. A method for reducing the original exchangeable metal content of a crystalline aluminosilicate zeolite to an exceptionally low level which comprises the steps of:
   (a) contacting said crystalline aluminosilicate with a solution of a cation of a metal selected from Groups I to VIII of the Periodic Table and ammonium and hydrogen at a temperature between 50° F. and 215° F. under atmospheric pressure;
   (b) contacting said crystalline aluminosilicate with a solution of a metal of Groups I to VIII of the Periodic Table at a temperature between 300° F. and 600° F. under sufficient pressure to maintain the solution in the liquid phase; and
   (c) withdrawing a cation exchanged zeolite having at least 80 percent of its initial exchangeable cations exchanged with the cations of said solutions.

2. A method according to claim 1 wherein the exchange at a temperature between 50° F. and 215° F. is of a crystalline aluminosilicate comprising exchangeable alkali metal cations and the resultant exchanged crystalline aluminosilicate is subjected to the exchange at a temperature between 300° F. and 600° F.

3. A method according to claim 2 wherein said exchange at a temperature between 300° F. and 600° F. is performed for a period of time correlated with solution temperature to lie within the area bounded between the maximum curve and the minimum curve lying between 300° F. and 600° F. of the accompanying figure.

4. A method according to claim 3 wherein the crystalline aluminosilicate is zeolite X.

5. A method according to claim 3 wherein the crystalline aluminosilicate is zeolite Y.

6. A method according to claim 3 wherein a fresh solution of rare earth salts is employed in the high temperature base exchange and a lean solution of rare earth salts is employed in the exchange performed at a temperature between 50° F. and 215° F.

7. A method according to claim 4 wherein the initial low temperature exchange is performed by passing the exchanged solution countercurrently through a bed of crystalline aluminosilicate in its alkali metal form.

8. A method according to claim 5 wherein the initial low temperature exchange is performed by passing the exchanged solution countercurrently through a bed of crystalline aluminosilicate in its alkali metal form.

References Cited
UNITED STATES PATENTS 3,483,137  12/1969  Sensel _____ 252—455
3,375,065  3/1968   McDaniel et al. _____ 23—112

CARL F. DEES, Primary Examiner

U.S. Cl. X.R.

252—455 Z